US006597280B1

(12) United States Patent
Daniel

(10) Patent No.: US 6,597,280 B1
(45) Date of Patent: Jul. 22, 2003

(54) METHOD OF DISSEMINATING VALUE-ADDED DATA

(75) Inventor: Peter Daniel, Schaafheim (DE)

(73) Assignee: DeTeMobil Deutsche Telekom MobilNet GmbH, Bonn (DE)

( * ) Notice: Subject to any disclaimer, the term of this patent is extended or adjusted under 35 U.S.C. 154(b) by 0 days.

(21) Appl. No.: 09/155,028

(22) PCT Filed: Mar. 17, 1997

(86) PCT No.: PCT/DE97/00540

§ 371 (c)(1),
(2), (4) Date: Mar. 19, 1999

(87) PCT Pub. No.: WO97/35447

PCT Pub. Date: Sep. 25, 1997

(30) Foreign Application Priority Data

Mar. 18, 1996 (DE) .......................... 196 10 493

(51) Int. Cl.⁷ ................................ H04Q 7/14
(52) U.S. Cl. ................... 340/7.43; 340/7.48; 340/7.46
(58) Field of Search ............... 340/7.48, 7.46, 340/7.43, 7.55, 7.35, 7.38, 7.21, 7.22, 7.23, 7.52, 7.47, 825.27; 370/313; 455/517

(56) References Cited

U.S. PATENT DOCUMENTS

| 4,369,443 A | * | 1/1983 | Giallanza et al. | 340/7.38 |
| 4,766,434 A | * | 8/1988 | Matai et al. | 340/7.55 |
| 4,818,987 A | | 4/1989 | Ide et al. | |
| 4,845,491 A | * | 7/1989 | Fascenda et al. | 340/7.47 |
| 5,241,305 A | | 8/1993 | Fascenda et al. | |
| 5,398,021 A | * | 3/1995 | Moore | 340/825.27 |
| 5,448,759 A | * | 9/1995 | Krebs et al. | 455/517 |
| 5,450,071 A | | 9/1995 | DeLuca et al. | |
| 5,493,282 A | * | 2/1996 | Petreye et al. | 340/7.35 |
| 5,694,120 A | * | 12/1997 | Indekeu et al. | 340/7.23 |
| 5,870,030 A | * | 2/1999 | DeLuca et al. | 340/7.48 |

FOREIGN PATENT DOCUMENTS

| EP | 0570937 | 5/1993 | H04B/5/04 |
| EP | 0680024 | 4/1995 | G08B/5/22 |
| EP | 0360228 | 9/1999 | G08B/3/10 |
| WO | 9015512 | 4/1990 | H04Q/7/00 |

* cited by examiner

Primary Examiner—Edwin C. Holloway, III
(74) Attorney, Agent, or Firm—Cooper & Dunham LLP

(57) ABSTRACT

A method for disseminating value-added information is described, starting from known radio paging services in which on one or more frequencies, by means of an address code which establishes the identity of a certain receiver, a message can be transmitted to the receiver, wherein at least one second standard address code is provided for identifying several receivers of the radio paging service, which is transmitted on one or more frequencies used by the radio paging service. By setting up a second address code, several subscribers to a radio paging service can be addressed simultaneously. The subscribers can in this case select and call up desired value-added information.

7 Claims, No Drawings

METHOD OF DISSEMINATING VALUE-ADDED DATA

The present invention is concerned with a method for disseminating value-added information on the basis of standardised code formats for radio paging services, according to the introductory part of claim 1.

Various radio paging services are known (RDS, Eurosignal, Cityruf, Scall) which are used mainly for transmitting customer-specific messages. Each customer has his own address code under which he can be called direct. For the reception of general, alphanumerical value-added information in broadcast mode, these known methods are not suitable or are suitable only to a very limited extent.

Known functions such as e.g. group paging or maildrop no longer meet the demands of the providers of value-added information, the network operators and the end users.

It is the object of the present invention to propose a method for disseminating value-added information, which provides substantially increased possibilities for the transmission and evaluation of value-added information, wherein compatibility with the previous known radio paging code formats is to be preserved.

This object is achieved by the characterising features of claim 1.

In order that the value-added information can generally be received by the receivers (terminals), the provision and notification of a standard second address code, in addition to the individual first address code, on one or more frequencies of the radio paging service is necessary.

The value-added information can thus be evaluated on any receiver (terminal) suitable for the radio paging service. The functions for value-added information are divided between different subaddresses of the standard address code.

The basic structure of the standard address code can look as follows:
1. Subaddress for control functions:
    The control function ensures mainly the individual provision of value-added information for the receiver. In particular it ensures the activation/deactivation of value-added information liable to a charge. Outside the value-added sphere, the control function can additionally be used for the remote control/remote programming of the receiver (terminal) by means of the calling frequencies. Known services such as e.g. "RIC over the air" can also be offered by this means. In order to remote-control or remote-program e.g. the terminal of the receiver, normally unambiguous identification by means of the first address code is necessary. According to the invention the programming command which is transmitted by means of the subaddress for control functions can contain as the unambiguous identification both the first individual address code and another unambiguous identification of the receiver (e.g. serial number of terminal).
2. Subaddress for receiving value-added information free of charge:
    By means of this subaddress, the terminal receives the value-added information free of charge which is transmitted by the operator of the radio paging network by broadcasting. For instance, general news in the field of sport, politics, economy, weather, etc. is available as subjects.
    To distinguish between the different subjects, the actual pause between news items is preceded by a subject header for each item of value-added information.
3. Subaddress for receiving value-added information for a charge:
    By means of this subaddress, the terminal receives the value-added information for a charge which is transmitted by the operator of the radio paging network by broadcasting. Special news which is mainly read by a certain circle of customers is available as subjects, such as e.g. stock exchange news, etc. A distinction is made between subjects analogously to operation for free value-added information.
4. Subaddress for receiving a subject summary (optional):
    By means of this subaddress, a current subject summary can be read and displayed by the terminal, which is transmitted by the operator of the radio paging network by broadcasting. A distinction is made between subjects analogously to operation for value-added information free of charge with an additional parameter for distinguishing between free and chargeable value-added subjects. By means of this subject summary the customer can select for display e.g. free value-added subjects from the subjects offered or have chargeable subjects activated through the network operator.

At least the chargeable value-added information must be capable of being cleared as well as blocked again by the operator. The subaddress for control functions therefore preferably contains a clearance function which allows clearance of value-added information for a limited or unlimited time. Clearance can however take place by any other known technical method such as by direct input of a suitable command into the receiver e.g. by means of keypads, inductively, capacitively, optically, acoustically, etc. The clearance function is based on a clearance and blocking datum which can be fixed for marked value-added information.

Cyclic transmission of time information is provided as a further function. In addition to use by the customers, transmission and evaluation of the time information at the terminals serve mainly to ensure the function for clearing or blocking value-added information.

The functions for receiving free and chargeable value-added information differ basically only in the different addressing to two separate subaddresses of the standard address code. The structure of the message is the same for both functions and consists e.g. of a subject header and subject contents.

By the subject header the allocation of the subsequent subject contents to a given subject is ensured. This is necessary in particular with chargeable value-added information, because here the customer selects only a partial service from the services offered and only this partial service is to be made available to him.

The subject summary which can be selected in the example under subaddress 4 is similar in structure to the functions for free and chargeable value-added information. A subject header and a parameter for distinguishing between free and chargeable value-added subjects to which a value-added subject can be allocated are provided. The current subject summary is transmitted cyclically, e.g. daily, by the network operator and can optionally be displayed as an additional service on the receiver. The current offer of free and chargeable value-added information is thus available to the customer at any time.

What is claimed is:
1. Methods for disseminating value-added information based on standardized code formats for radio paging services in one or more frequencies, by means of an address code which establishes the identity of a certain receiver, whereby a message carrying value-added information is transmitted to the receiver according to the type of the value-added information indicated by the receiver, wherein at least a second standard address code is provided for identifying several receivers of the radio paging service, which is transmitted in one or more frequencies used by said radio paging service, wherein the second standard address code includes:

a first subaddress for control functions that enable activation or deactivation of chargeable value-added information;

a second subaddress for receiving free value-added information;

a third subaddress for receiving chargeable value-added information; and a fourth subaddress for receiving a value-added information subject summary comprising a subject header and a parameter for distinguishing between the free and chargeable value-added information subjects, wherein the subject summary is transmitted cyclically by a network operator for offering free and chargeable value-added information to the receiver at any time, regardless of whether the receiver has authorization to receive the individual information.

2. Method according to claim 1, characterized in that, by means of the second address code, several subaddresses are addressable and they allow message transmission in text format.

3. Method according to claim 1, characterized in that, by means of the first subaddress of the second standard address code, control or monitoring information is transmitted from a remote location.

4. Method according to claim 1, characterized in that free reception of the value-added information occurs only if the second subaddress is used.

5. Method according to claim 1, characterized in that the use of chargeable value-added information is cleared or blocked by the network operator, by means of the first subaddress.

6. Method according to claim 1, characterized in that, by means of the first subaddress of the second standard address code, cyclic transmission of a piece of time information takes place.

7. Method according to claim 1, characterized in that a charge is incurred for reception of the value-added information only if the third subaddress is used.

* * * * *